United States Patent [19]
Moatti

[11] 3,853,762
[45] Dec. 10, 1974

[54] SELF-CLEANING FILTER

[76] Inventor: Georges Moatti, 17 Rue Gutemberg, 92100 Boulogne, France

[22] Filed: June 7, 1973

[21] Appl. No.: 367,748

[30] Foreign Application Priority Data
July 19, 1972 France .............................. 72.26048

[52] U.S. Cl. ................................ 210/108, 210/333
[51] Int. Cl. ............................................ B01d 29/38
[58] Field of Search ............ 210/107, 108, 488, 333

[56] References Cited
UNITED STATES PATENTS

| | | | |
|---|---|---|---|
| 3,228,524 | 1/1966 | Richards | 210/108 X |
| 3,283,903 | 11/1966 | Muller | 210/108 |
| 3,388,799 | 6/1968 | Rymer | 210/108 X |
| 3,445,002 | 5/1969 | Muller | 210/488 X |
| 3,647,084 | 3/1972 | Martin | 210/488 X |
| 3,717,252 | 2/1973 | Picard | 210/108 |

Primary Examiner—Samih N. Zaharna
Assistant Examiner—Robert H. Spitzer
Attorney, Agent, or Firm—Alvin Sinderbrand; Lewis H. Eslinger

[57] ABSTRACT

The invention is a self-cleaning filter composed of an assembly of stacked filter elements with a central feed passage containing a movable obturating distributor which successively isolates the feed orifices of the filter elements for counter-current washing. The sliding movement of the obturator is controlled by a piston moving in a chamber and actuated by the treated fluid which acts alternately on each side of the piston. A valve is actuated at the end of the piston stroke closing a passage for fluid arranged in the piston body in order to open the passage on one side and close it on the other side.

8 Claims, 4 Drawing Figures

SELF-CLEANING FILTER

The present invention relates to filters formed of a plurality of discoid filtering elements fed in parallel by a central conduit, a distributor enabling the filters to be successively isolated for washing in counter-current.

The distributor is generally rotary and alternately isolates the filtering chambers arranged in the filtering elements.

This device necessitates elements having a plurality of separate chambers and a device for rotating the well synchronized distributor.

The invention therefore has for its subject a self-cleaning filter composed of an assembly of stacked filtering elements with a central feed passage in which moves an obturating distributor which successively isolates the feed orifices for counter-current washing, wherein the obturator slides in a reciprocating movement in the central passage, thanks to a piston moving in a chamber and actuated by the treated fluid which acts alternately on each side of the piston, a valve actuated at the end of stroke of the piston closing a passage of fluid arranged in the body of the piston in order to open the passage on one side and close it on the other side.

The invention will be more readily understood upon reading the following description with reference to the accompanying drawings, in which.

Figure 1:
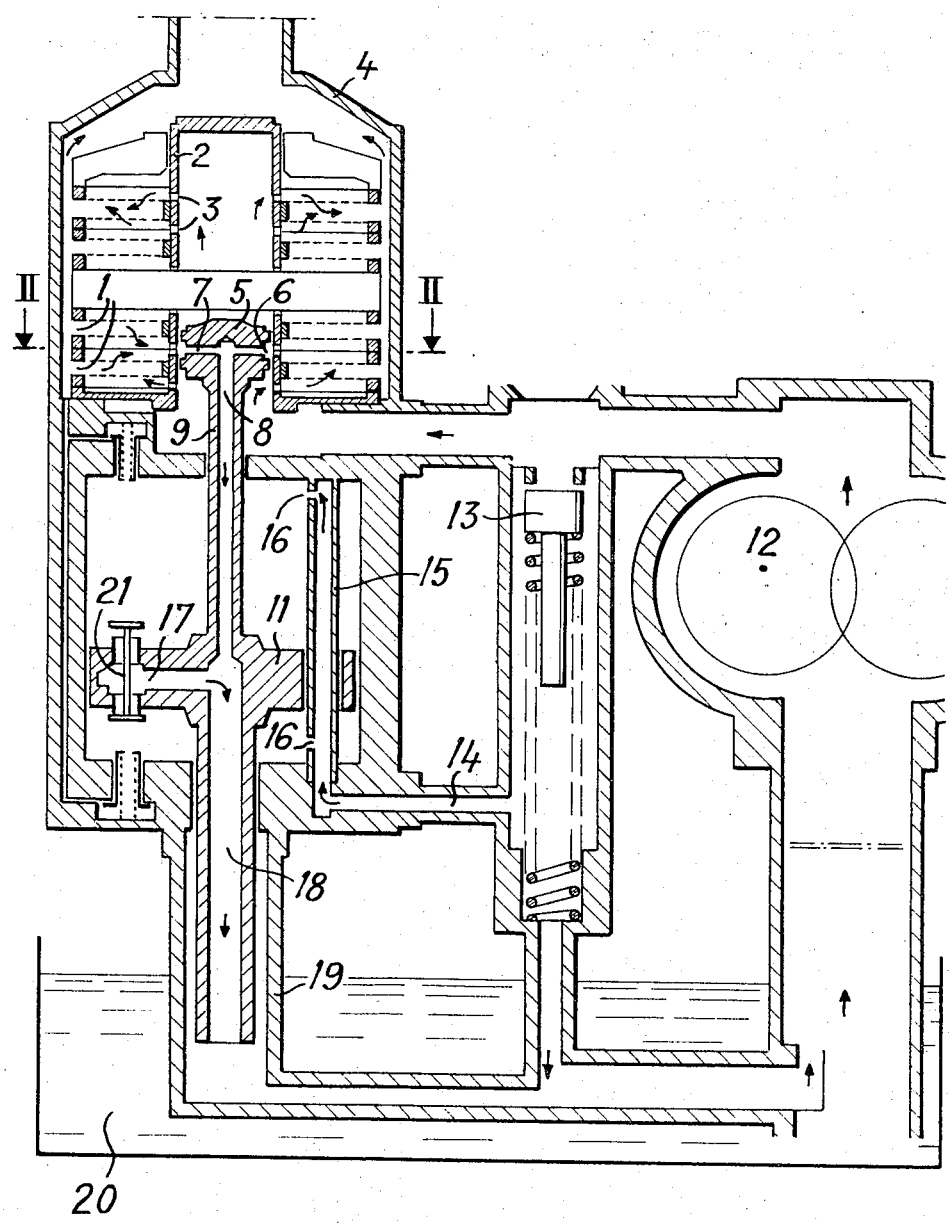
FIG. 1 is a section through a filter according to the invention.
Figures 2, 4:
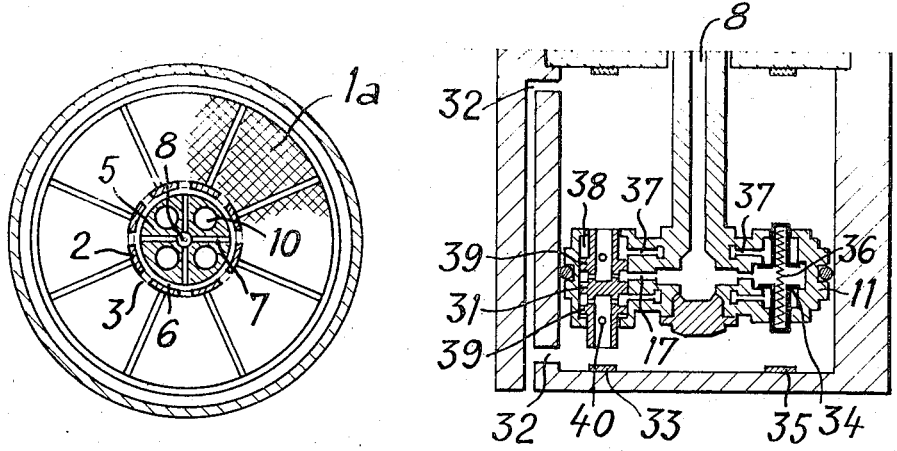
FIG. 2 is a section along II—II of FIG. 1.
FIG. 4 is a view of a variant embodiment of the motor actuating the filter according to the invention.

Referring now to the drawings, the filter is constituted of discoid filtering elements comprising a central passage in which is mounted a tube 2 pierced with orifices 3 for feeding the filter thus constituted, which is enclosed in a casing 4 collecting the filtered liquid, each element 1, as shown in FIG. 2, is constituted of separate chambers 1a, but elements having one sole annular filtering gauze may be used, the space between two elements, forming, on one of them, a supply chamber.

In the tube 2 which is closed at one end, moves a piston 5 which forms the obturating distributor for counter-washing. This piston 5 comprises a peripheral groove 6 in communication by radial conduits 7 with a central channel 8 made in the piston and the rod 9 on which the piston is mounted.

The piston is in addition pierced with holes 10 enabling the liquid to be filtered to pass from one side of the piston to the other.

The rod 9 is integral with a piston 11 of a motor for driving the obturator which is animated by a reciprocating movement in the tube 2.

This drive piston 11 is fed alternately on each face by the liquid to be filtered, one part of which is sent to the filter by pump 12 whilst another part, shunted by the discharge valve 13, feeds the drive motor by conduit 14.

This conduit 14 is connected to a collector 15 which passes in tight manner through the piston 11 and serves as anti-rotation guide therefor.

This collector is provided at each end with a feed orifice 16 bringing the liquid on each side of the piston 11 in the chamber where it moves.

The liquid is evacuated through a conduit 17 made in the drive piston and which rejoins the conduit 8 extended by a tube 18 which plunges into a channel 19 returning to the reservoir 20.

The conduit 17 which opens out on each face of the piston is closed by a reverser valve 21 which alternately opens the conduit 17 on one side of the piston.

Figure 3:
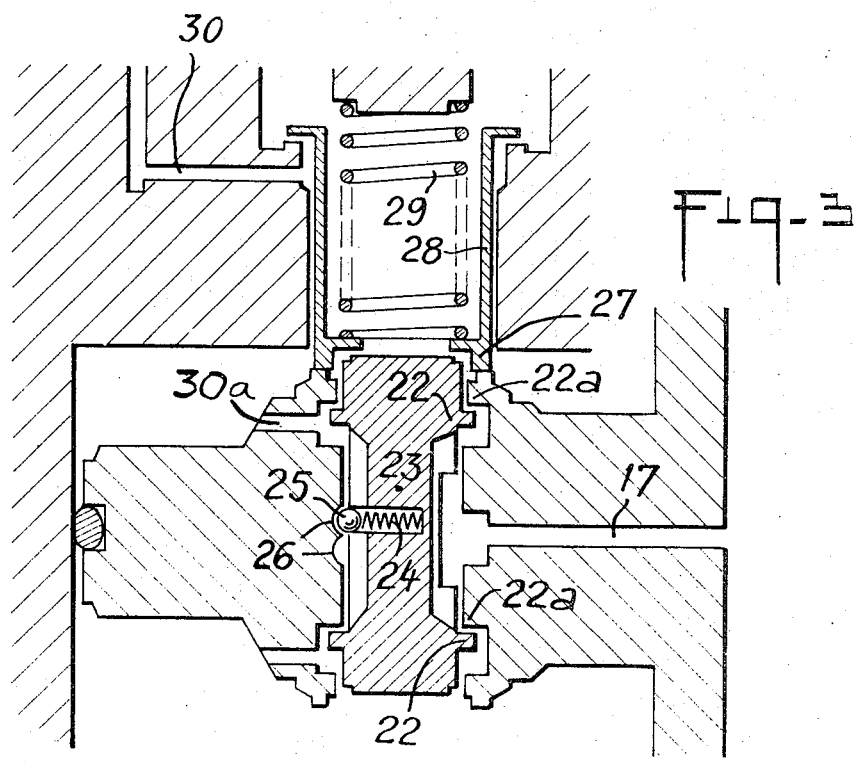
FIG. 3 is a detailed view, on a larger scale, of the stroke reversing device of the motor of the obturating distributor of the filter of FIG. 1.

As shown in greater detail in FIG. 3, the reverser valve comprises two heads 22 connected by a rod 23 provided with a springed positioning device 24 and ball 25, which is housed in one of the two recesses 26 made in the piston.

At the end of stroke, this valve is actuated by a stop 27 which is constituted of a jacket 28 sliding against a spring 29 which holds it in position of obturation of a conduit 30 bringing filtered liquid which acts on the valve head which has penetrated in the jacket 28 and pushes this head against its seat 22a closing evacuation on this side of the piston whilst, on the other side, the valve opens, thus enabling the movement of the piston 11 to be reversed, the liquid passing through a small conduit 30a, valve 22 and conduit 17.

It is thus seen that the obturator piston 5 is animated by a reciprocating movement in the tube 2. Thus, each time the groove 6 passes in front of the apertures 3, the filtering gauzes which enframe these apertures are subjected to the pressure of the filtered liquid and thus washed in counter current, the impurities being taken along towards the reservoir.

According to a variant shown in FIG. 4, the drive piston 11 functions with the washing fluid which arrives through channel 8 and conduit 17 which is closed by a slide valve 31 distributing the fluid on one side or the other of the piston 11. The fluid leaves the chamber through two output conduits 32 located at its ends, the calibre of the conduit 32 and the input passage through the slide valve 31 being such that the input flow is greater than the output flow. The slide valve at the end of stroke is pushed by a stop 33 and closes the fluid input. To terminate the reversal of the slide valve and open the fluid input on the other side of the piston, there is provided a reverser with two opposite valves 34 actuated by a stop 35 at the base of the chamber and maintained in position by a spring 36.

This valve 34, when it is pushed back on arriving on the stop, communicates the fluid input 8 with a conduit 37 which feeds an annular chamber 38 surrounding the slide-valve 31, the fluid pressure acting on the annular part 39 of the slide-valve for pushing said latter in open position of the conduit 17 on the side of the piston arriving at the base of the chamber, the slide-valve comprising an orifice 40 of small diameter allowing the evacuation of the fluid located in the annular chamber which is not fed and being too small to allow all the fluid entering into the annular chamber 38 to pass.

The invention is not limited to the embodiment which has been described and shown, but covers on the contrary all the variants. In particular, it will be noted that the drive motor may function with the filtered fluid, to be filtered or for counter-washing.

What I claim is:

1. A self-cleaning filter comprising a plurality of stacked filtering elements forming filtration chambers in tiers, a central tube extending through said filtration chambers defining a central feed passage; said tube having liquid feed orifices formed therein communicating with said filtration chambers; obturating distributor means located in said passage for supplying liquid to be treated to said filtration chambers while successively isolating the feed orifices of the tiered filtration chambers from the liquid to be treated to permit countercurrent washing; and means for reciprocating the obturator in the central passage with respect to said orifices to successively isolate the feed orifices; said reciprocating means including a housing defining a piston chamber, a piston slidably mounted in said piston chamber for movement between two extreme stroke positions and operatively connected to said obturator, and means for simultaneously supplying liquid to both sides of the piston in said piston chamber, said piston having a liquid discharge port formed therein providing communication between the piston chamber on both sides of the piston and the exterior of the piston housing and valve means mounted in the piston for alternately opening and closing said liquid discharge port to said piston chamber at alternate sides of the piston at the end of each stroke of the piston whereby alternate sides of the piston are subjected to the liquid supplied to said piston chamber thereby causing reciprocation of the piston and successive isolation of said filtration chambers by said obturator.

2. A filter as claimed in claim 1 wherein said piston includes a piston rod extending through said chamber and having said discharge port formed therein; and said valve means comprises a double acting valve mounted in the piston; said chamber including stop means at opposite ends thereof for actuating said valve.

3. A filter as claimed in claim 2, wherein said obturator is mounted on the piston rod and has a peripheral groove formed therein for collecting the washing fluid and a plurality of radial channels providing communication between the groove and the liquid discharge ports of the piston rod to allow said countercurrent washing.

4. A filter as claimed in claim 3, wherein the obturator has transverse passages formed therein enabling the fluid to be treated to pass through said tube from one side of the obturator to the other.

5. A filter as claimed in claim 2, wherein the valve rod is provided with a positioning device constituted of a ball pushed by a spring, said ball being housed in positioning recesses provided on the valve rod.

6. A self cleaning filter comprising a plurality of stacked filtering elements forming filtration chambers in tiers, a central tube extending through said filtration chambers defining a central feed passage; said tube having liquid feed orifices formed therein communicating with said filtration chambers; obturator distributor means located in said passage for supplying liquid to be treated to said filtration chambers while successively isolating the feed orifices of the tiered filtration chambers from the liquid to be treated to permit counter current washing; and means for reciprocating the obturator in the central passage with respect to said orifices to successively isolate the feed orifices; said reciprocating means including a housing defining a piston chamber, a piston slidably mounted in said piston chamber for movement between two extreme stroke positions and operatively connected to said obturator; said piston having a liquid outlet port communicating with said chamber on both sides of the piston and said chamber having a pair of liquid discharge passages communicating therewith at opposite ends of the chamber to discharge liquid on opposite sides of the piston; said piston having a piston rod including a central supply passage for supplying liquid to said piston liquid outlet port; and valve means mounted in said piston for alternately opening and closing said piston liquid discharge port to said piston chamber at alternate sides of the piston at the end of each stroke of the piston, said piston liquid discharge port being dimensioned to allow liquid flow there-through at a greater rate than the liquid flow through the liquid outlet passages of the piston chamber whereby alternate sides of the piston are subjected to liquid from the liquid outlet port of the piston thereby causing reciprocation of the piston and successive isolation of said filtration chambers by said obturator.

7. A filter as defined in claim 6 wherein said obturator is mounted on the piston rod and has a peripheral groove formed therein for collecting the washing fluid and a plurality of radial channels providing communication between the groove and the central supply passage of the piston rod, thereby to supply said washing fluid to the liquid outlet port of the piston.

8. A filter as defined in claim 7 wherein the obturator has transverse passages formed therein enabling the fluid to be treated to pass through said tube from one side of the obturator to the other.

* * * * *